United States Patent
Chatroux et al.

(10) Patent No.: US 7,255,839 B2
(45) Date of Patent: Aug. 14, 2007

(54) DEVICE AND METHOD FOR TREATING A SUBSTANCE CONTAINING UNDESIRABLE ORGANISMS USING A PULSED ELECTRICAL FIELD

(75) Inventors: Daniel Chatroux, Montelimar (FR); Philippe Nouvel, Sauzet (FR); Julien Scordia, Varneville (FR)

(73) Assignee: Commissariant a l'Energie Atomique, Paris (FR)

( * ) Notice: Subject to any disclaimer, the term of this patent is extended or adjusted under 35 U.S.C. 154(b) by 383 days.

(21) Appl. No.: 10/490,738

(22) PCT Filed: Oct. 16, 2002

(86) PCT No.: PCT/FR02/03537

§ 371 (c)(1),
(2), (4) Date: Apr. 8, 2004

(87) PCT Pub. No.: WO03/039271

PCT Pub. Date: May 15, 2003

(65) Prior Publication Data

US 2004/0238348 A1 Dec. 2, 2004

(30) Foreign Application Priority Data

Oct. 18, 2001 (FR) .................................. 01 13431

(51) Int. Cl.
*C02F 1/46* (2006.01)
(52) U.S. Cl. ...................... 422/186; 426/237; 204/164; 204/165
(58) Field of Classification Search ................ 426/237, 426/244; 204/164, 165; 422/22, 186
See application file for complete search history.

(56) References Cited

U.S. PATENT DOCUMENTS

| | | | |
|---|---|---|---|
| 4,695,472 A | 9/1987 | Dunn et al. | |
| 5,690,978 A | 11/1997 | Yin et al. | |
| 6,014,584 A * | 1/2000 | Hofmann et al. | ............. 604/21 |
| 6,027,754 A | 2/2000 | Bushnell et al. | |
| 6,077,479 A | 6/2000 | Milde et al. | |
| 6,231,908 B1 | 5/2001 | Lelieveld et al. | |
| 6,653,114 B2 * | 11/2003 | Walters et al. | ........... 435/173.6 |

FOREIGN PATENT DOCUMENTS

| | | |
|---|---|---|
| CH | 319 956 | 3/1957 |
| CN | 1 072 328 | 5/1993 |
| DE | 23 36 085 | 2/1975 |
| EP | 1 123 662 | 8/2001 |
| FR | 2 792 207 | 10/2000 |
| WO | 93/25097 | 12/1993 |
| WO | 99/63843 | 12/1999 |
| WO | 00/56179 | 9/2000 |

* cited by examiner

*Primary Examiner*—Arun S. Phasge
(74) *Attorney, Agent, or Firm*—Oblon, Spivak, McClelland, Maier & Neustadt, P.C.

(57) ABSTRACT

A device for treating a substance containing at least one undesirable organism, using a pulsed electrical field. The device includes at least one treatment zone of the substance located within a passage zone associated with the substance. Each treatment zone is only partially located within the associated passage zone. The device also includes a mechanism to create movement for displacing each treatment zone of the substance in the entire associated passage zone.

20 Claims, 4 Drawing Sheets

DEVICE AND METHOD FOR TREATING A SUBSTANCE CONTAINING UNDESIRABLE ORGANISMS USING A PULSED ELECTRICAL FIELD

TECHNICAL DOMAIN

The invention relates to the domain for treatment of substances colonised by undesirable organisms.

More particularly, the invention relates to the treatment of a semi-solid or liquid food type substances such as milk, orange juice or egg white. In this case, the organisms to be destroyed during the treatment are bacteria, spores or any other undesirable micro-organism that has colonised the food to be treated.

The invention may also concern the water treatment domain, for example to make it drinkable, by destroying bacteria and any other undesirable organism such as shells or mussels.

Finally and more specifically, this invention relates to devices and processes for treatment of a flowing substance colonised by undesirable organisms, using a pulsed electrical field.

STATE OF PRIOR ART

Apart from chemical treatment methods unrelated to the specific domain of the invention, there are three different types of treatment methods for flowing substance colonised by at least one undesirable organism.

The first known of these various methods are processes based on a pressure wave propagating in a medium to be treated. This wave is generated by an electric arc provoked in the medium itself or in an adjacent chamber, this chamber comprising a flexible membrane capable of transferring these waves into the medium to be treated.

The main disadvantage of this method is due to the loss or degradation of gustative and nutrition qualities of the treated food.

The second type of method consists of known processes based on the application of a DC electrical current in the medium to be treated. This type of method introduces fatal effects for undesirable organisms, firstly due to the formation of electrolysis products on the electrodes, and secondly due to the increased temperature in the medium to be treated.

In this process, the electrical power supply remains simple and inexpensive, but it must be coupled to a device for cooling the medium, which considerably reduces the cost effectiveness of the system. Moreover, there is also a loss or degradation of the gustative or nutrition qualities of the treated food.

The last known type of method that specifically relates to the invention consists of applying a pulsed electrical field within the medium to be treated.

This type of method is particularly attractive due to the lack of any secondary effects on the treated substance, particularly concerning its gustative and nutrition qualities. Several short voltage pulses are applied, of the order of a hundred nanoseconds to a few microseconds, which is never enough to significantly increase the temperature of the substance to be treated. Thus, no additional cooling means is necessary to implement this type of process.

There are two main categories of devices capable of treating substances using a process applying a pulsed electrical field.

The first category consists of so-called transverse devices, in other words devices in which the applied pulsed electrical field is approximately perpendicular to a main flow direction of the substance.

The second category consists of so-called longitudinal devices, in other words devices in which the applied pulsed electrical field is approximately parallel to a main flow direction of the substance.

According to prior art, longitudinal devices have a better treatment effectiveness than transverse devices, for operation at equal power. However, although they are very effective for treatment of the substance, these devices comprise plates or grids through which the substance to be treated passes, to make the pulsed electrical field uniform, but these plates or grids introduce considerable pressure losses. Therefore in processing large volumes of substances, it is essential to use a pump for which the consumed power is absolutely incompatible with cost effective industrial production, particularly due to the small area of the openings formed in the grids or in the plates.

The two categories of devices are described in documents FR 2 792 207 and WO 99 63843. Another disadvantage related to these devices relates to the small value of the frequency of electrical pulses, this characteristic prohibiting the treatment of large volumes of substance. The effectiveness of the treatment depends directly on the amplitude of the pulses in the pulsed electrical field, but is in no case dependent on the duration of these pulses.

Document U.S. Pat. No. 6,077,479 illustrates another type of longitudinal device. An insulation is inserted between each pair of electrodes, which has the effect of locally increasing the value of the electrical field at this insulation. The advantage lies in a limitation of leakage field lines, and consequently a limitation of dissipations by the Joule effect in the treated substance.

However, the applied electrical field is non-uniform since it is maximum on the edge of the duct and is minimum at the centre of the duct. Consequently, the substance is not treated uniformly and does not satisfy specific needs of industrial production.

Transverse treatment devices are usually considered to be less effective from the point of view of treatment quality, but introduce smaller pressure losses than losses encountered in longitudinal treatment devices.

This is how the same document U.S. Pat. No. 6,077,479 partially solves the problem of non-uniformity of the applied electrical field, by inserting an insulating element through which several passages are formed perpendicular to the main flow direction of the substance. This insulating element makes all field lines converge in substance passages, in order to locally increase the value of the electrical field inside these passages. However, this type of device generates high pressure losses so that high substance flows cannot be treated.

According to prior art, particularly as divulged in document WO 93 25097, it is essential to cover the electrodes in this type of transverse device with materials such as gold, platinum or metallic oxides, so that these electrodes do not participate in the electrolytic reaction while current is being passed. According to this document, it is essential that protection should be taken against the formation of electric arcs, which also introduces the need for expensive safety means. Moreover, with this type of device, the dimensions of the passage cross-sectional area for the substance are very small, such that the treatment flow is limited.

Document WO 00 56179 proposes a solution in which the electrodes are not in contact with the substance to be treated, so as to overcome problems of deposits on these electrodes. However, this device must use magnetic compression fittings to achieve very short pulse times of the order of 0.07 ns to 7 ns. This very high transient frequency also causes problems related to relative permittivities of the walls. The permittivities of these walls must be at least equal to or greater than the permittivity of the substance to be treated. The treatment is ineffective if these technical characteristics are not respected, since the applied electrical field is only present in the walls and not in the substance to be treated.

To solve this problem, document U.S. Pat. No. 4,695,472 proposes to correct the disadvantages previously mentioned using a membrane through which ions can pass. Nevertheless, this type of device can be affected by electric arcs and cannot be used to treat high substance flows.

Many other transverse devices are known according to prior art. These devices, in the same way as devices previously mentioned, normally use an electronic gas tube type of pulse generator, which is very expensive but satisfies the needs to output high currents to the substance to be treated.

Furthermore, apart from the high investment cost due to the need to obtain an electronic gas tube type of generator, the operating cost of transverse devices is also relatively high due to the limited life of these generators. These generators are affected by an aging phenomenon due to cathodic erosion type wear, so that they need to be replaced relatively frequently. Note that this problem is also encountered in longitudinal devices.

Finally, almost all transverse treatment devices have the same disadvantage that the treatment is only satisfactory if the substance flow to be treated is low. This major disadvantage in terms of cost effectiveness of the device originates either due to the fact that the cross section of an area of the passage is too narrow, or due to a limitation in the capacity of the generator to operate at a high pulse frequency. In this case some devices use an added magnetic compressor to increase the frequency of these pulses, which inevitably increases the costs of using the treatment device.

OBJECT OF THE INVENTION

Therefore, the purpose of the invention is to entirely or partly overcome the disadvantages mentioned above with the treatment devices according to prior art.

Furthermore, the purpose of the invention is to propose a device using a pulsed electrical field for the treatment of a flowing substance colonised by at least one undesirable organism, this device being capable of treating high substance flows at low cost.

Finally, another purpose of the invention is to present a process using a pulsed electrical field for the treatment of a flowing substance colonised by at least one undesirable organism, this process being capable of being used by a treatment device like that satisfying the purpose mentioned above.

To achieve this, the purpose of the invention is a device using a pulsed electrical field for the treatment of a flowing substance colonised by at least one undesirable organism, the device comprising a flow zone of the substance in which there is at least one treatment zone located within a passage zone associated with the substance. According to the invention, each treatment zone is only partially located within the associated passage zone, the device also comprising means of creating movement for displacing each treatment zone of the substance in the entire associated passage zone.

Advantageously, the device according to the invention uses one or several treatment zones, in which the volume of each at a given time t of the treatment of the substance, is strictly less than the volume of the associated passage zone. The fact that each of these treatment zones is moving in the entire associated passage zone can result in a high flow of the treated substance, while enabling effective treatment.

Moreover, this particular arrangement of means reduces investment and operating costs of the device. Since the quantity of substance to be treated at a given treatment time t is very low, the generators used can generate lower currents than those required for devices in prior art. Therefore the current to be output by the electrical pulse generator is lower, due to the increase in the equivalent resistance of the substance, caused directly by the reduction in its volume. Consequently, generators that can be used in the device according to the invention are less expensive and also more reliable.

Preferably, each treatment zone is formed by a combination of two electrodes facing each other, the electrodes comprising a primary electrode placed on a device inside the substance flow zone, and a secondary electrode placed on a wall partly delimiting the flow zone.

One advantage with this type of device is that it is possible to make either or both of the two electrodes rotate to form a moving treatment zone in the associated passage zone. With this particular arrangement, a pulsed electrical field approximately perpendicular to the main flow direction of the substance can be obtained.

In another preferred embodiment of the invention, each treatment zone is formed by a combination of two electrodes placed at a spacing from each other, in a main substance flow direction, the means of creating movement comprising means of rotating of at least a part of the wall on which the electrodes are located.

Moreover, it is also possible that each treatment zone could be formed by a combination of two electrodes placed at a spacing from each other, in a main substance flow direction, on a device placed in a flow zone of this substance, the means of creating movement comprising means of rotating of the device located inside the flow zone start.

Advantageously, the preferred embodiments of the invention in which the two electrodes are positioned at intervals on a single element of the device, provide a means of creating an electrical field approximately parallel to the main flow direction of the substance.

Preferably, the device located in the flow zone comprises an insulating rounded cone, which facilitates smooth flow of the substance by minimizing pressure losses inside the flow zone of this substance.

Since the substance can be treated with low currents, the device may comprise a pulse generator with electronic switches based on semiconductor or matrices of semiconductors.

This type of generator is very reliable and quite suitable for operation at high frequencies, of up to 1 MHz. This characteristic means that high substance flows can be treated, the treatment quality not being dependent on the duration of the pulses, but simply on their amplitude. By increasing the frequency of these electrical pulses, it then becomes possible to treat higher substance flows than is possible with devices according to prior art, while maintaining or increasing the treatment quality.

Furthermore, these particular generators are very low cost, particularly in comparison with the cost of gas tube type generators.

Advantageously, the pulse generator may be coupled to magnetic compression means. A system of saturable inductances can be used such that these compression means generate a reduction in the time of the pulses, without modifying the treatment quality. The consumed energy is then lower and the temperature increase within the substance is lower. Treated foods thus maintain their nutrition and gustative qualities without it being necessary to use any additional means for cooling the substance.

Another purpose of the invention is a process for the treatment of a flowing substance colonised by at least one undesirable organism using a pulsed electrical field, this process being used by means of a treatment device like that described in this invention.

Other characteristics and advantages of the invention will become clear from the non-limitative description given below.

BRIEF DESCRIPTION OF THE DRAWINGS

This description will be made with reference to the attached drawings among which.

DETAILED PRESENTATION OF PREFERRED EMBODIMENTS

Figure 1:
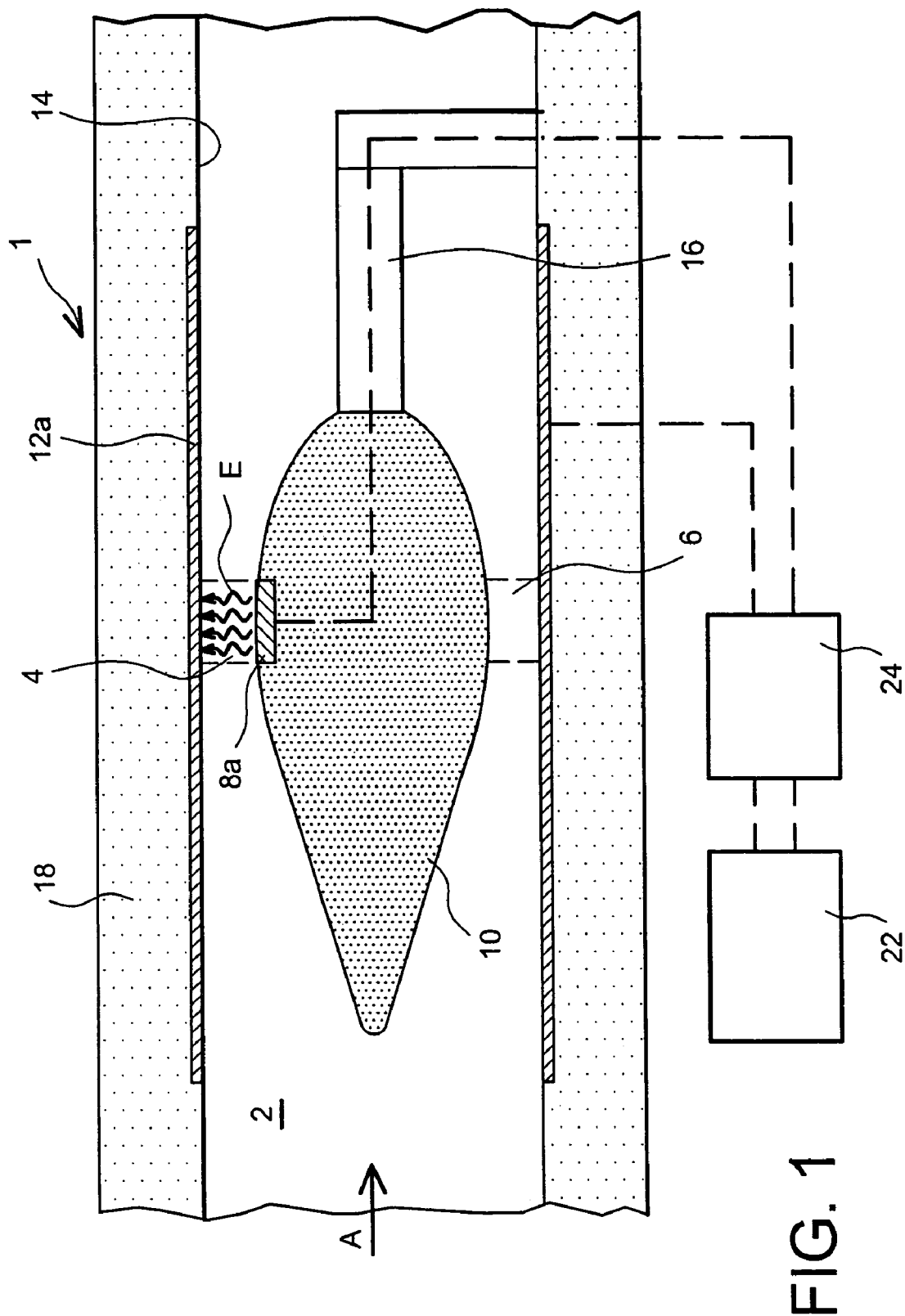
FIG. 1 shows a diagrammatic view of a device according to a first preferred embodiment of the invention.
Figure 2:
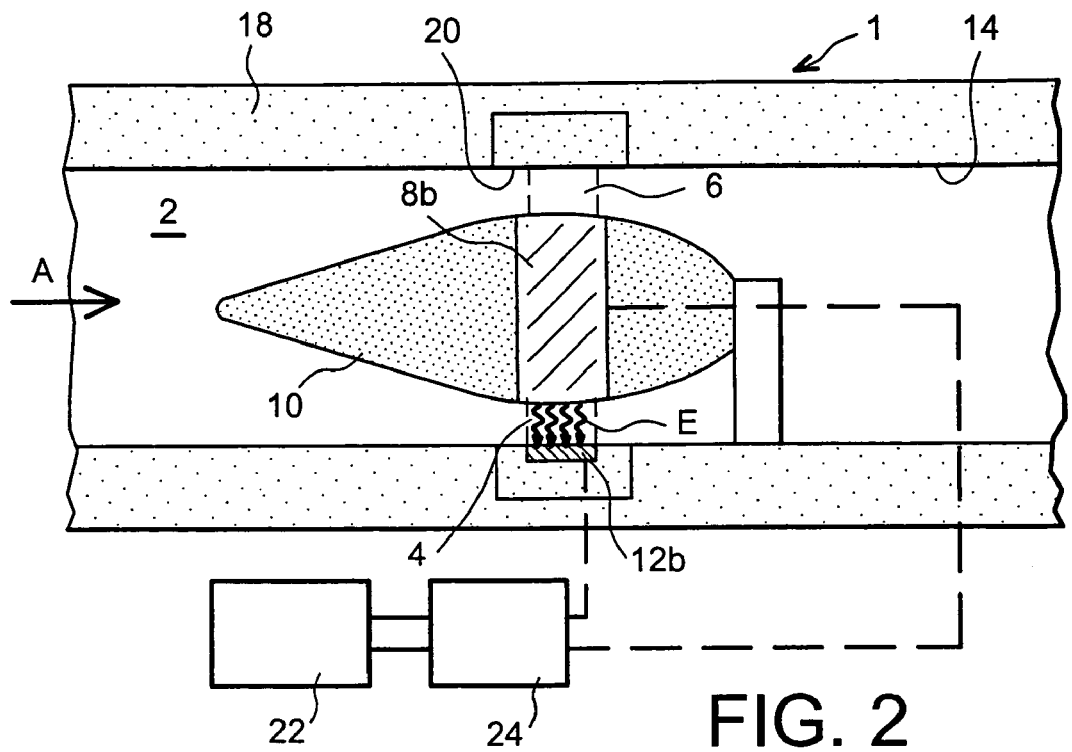
FIG. 2 shows a diagrammatic view of a device according to a second preferred embodiment of the invention.
Figure 3:
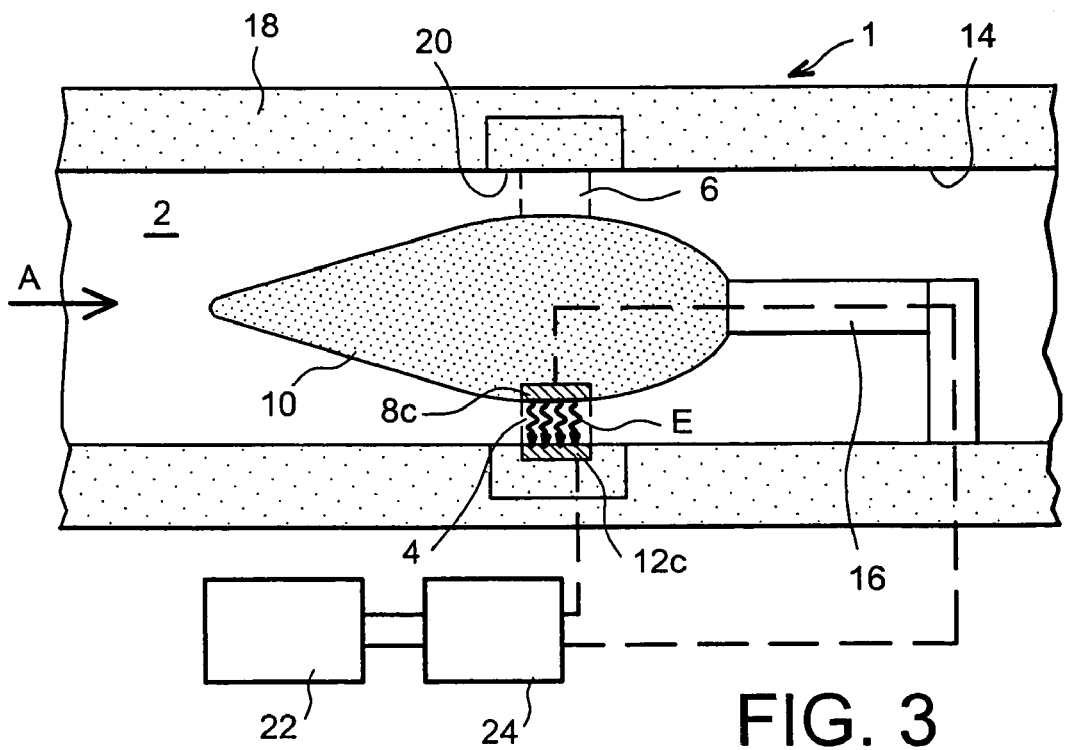
FIG. 3 shows a diagrammatic view of a device according to a third preferred embodiment of the invention.

FIGS. 1 to 3 show a pulsed electrical field treatment device 1 according to different preferred embodiments of the invention.

A substance to be treated circulates in a flow zone 2 of the device 1, in a main flow direction of the substance represented by arrow A. Flow of the substance is controlled by pump type means (not shown) coupled to the device 1.

The substance to be treated may be of any type. For example, liquid foods such as milk, orange juice or egg white, semi-solid foods, or water to be made drinkable. In some cases, a mix of at least two of the elements mentioned above can also be treated.

The purpose of the treatment by pulsed electrical field is to eliminate all undesirable organisms that have colonised the substance. These include bacteria, spores or any other undesirable microscopic organism that could colonise the substance.

The device comprises at least one substance treatment zone 4, and preferably only one. A pulsed electrical field is applied inside this treatment zone 4, which is capable of destroying undesirable organisms that have colonised the substance to be treated. The arrows E on the different FIGS. 1 to 3 symbolise field lines of the pulsed electrical field in the treatment zone 4.

The treatment zone 4 is located in a passage zone 6 associated with it, but is only partially located within the passage zone 6 of the substance, such that the volume of the treatment zone 4 is less than the volume of the associated passage zone 6. In other words, the passage zone 6 is preferably and approximately in the form of a ring, while the treatment zone only forms a single angular portion of this ring.

Furthermore, in order to be able to treat the entire substance located in the passage zone 6, the device 1 is provided with means of moving the treatment zone 4 such that the treatment zone 4 of the substance can move sufficiently to cover the entire associated passage zone 6. Thus, at any treatment time t, action is only taken on part of the substance located within the passage zone 6, which means that very high substance flows can be treated, with a very satisfactory quality treatment.

According to the different preferred embodiments of the invention shown in FIGS. 1 to 3, the treatment zone 4 of the substance is formed by the association of two electrodes facing each other. They are a primary electrode 8a, 8b, 8c placed on a device 10, and a secondary electrode 12a, 12b, 12c placed on a wall 14 partly delimiting the treatment zone 4. Obviously, these primary and secondary electrodes have opposite polarities such that when they are put together in combination with a pulse generator 22, a pulsed electrical field is generated.

Several techniques could be used to move the treatment zone 4.

According to a first embodiment with reference to FIG. 1, the means of moving the treatment chamber 4 comprise motor type means 16 to rotate the device 10 inside the flow zone 2. The surface area of the primary electrode 8a is then small and it is driven in rotation by means of the device 10, preferably composed of an insulating rounded cone, in order to cooperate with the immobile and annular secondary electrode 12a. Preferably, the secondary electrode 12a is composed of a conducting duct 18 inside which the substance to be treated flows, and the device 10 is centred on an axis of this duct 18 around which it rotates.

In a second preferred embodiment of the invention that can be seen in FIG. 2, the means of moving the treatment chamber 4 comprise means (not shown) of rotating at least a part 20 of the wall 14 on which the secondary electrode 12b is located. The secondary electrode 12b is thus rotated by means of the part 20 of the wall 14 around the device 10, on which the immobile and annular primary electrode 8b is located.

FIG. 3 shows a third preferred embodiment of the invention. In this particular embodiment, the means of moving the treatment zone 4 comprise firstly means 16 of rotating the device 10 inside the flow zone 2, and secondly means (not shown) of rotating at least a part 20 of the wall 14 on which the secondary electrode 12c is located. In this case, the primary electrode 8c and the secondary electrode 12c are both small in area and rotating, such that their movement enables these electrodes 8c, 12c to remain facing each other, so that they can work together to form a treatment zone 4.

In these first three preferred embodiments of the invention, the particular position of the first electrodes 8a, 8b, 8c and the second electrodes 12a, 12b, 12c create a transverse pulsed electrical field, namely an electrical field in a direction approximately perpendicular to the main flow direction of the substance (arrow A).

Furthermore, it is also possible to use a treatment device 1 in which the pulsed electrical field is longitudinal, therefore in a direction approximately parallel to the main flow direction. This is the case particularly for devices 1 shown in FIGS. 4 and 5, in which the arrows E' symbolically show field lines of the longitudinal pulsed electrical field.

Figure 4:
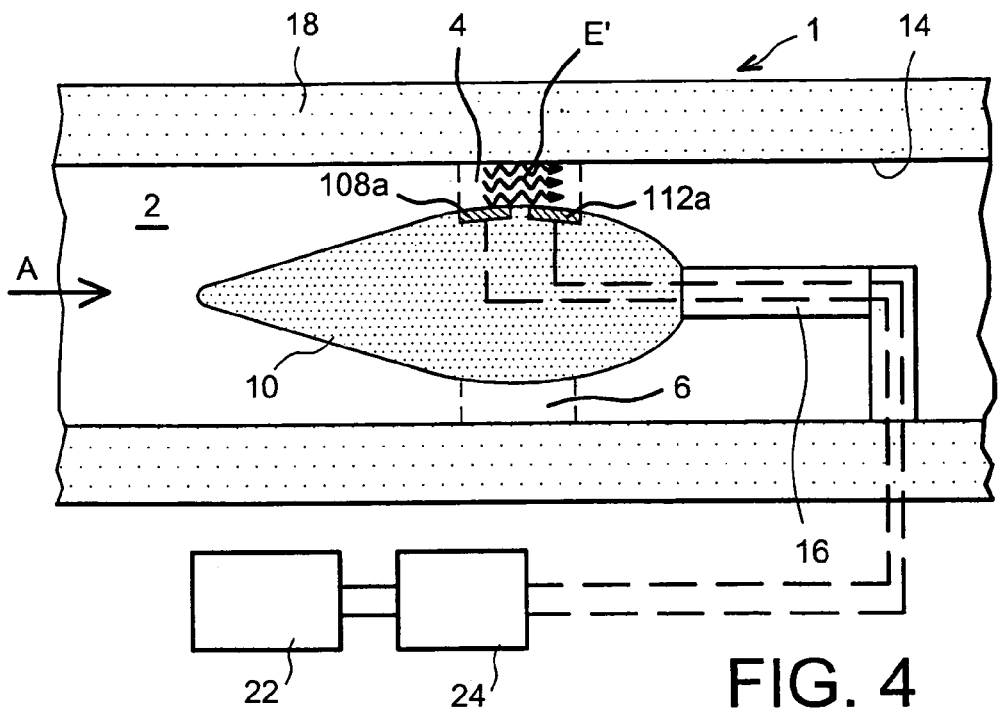
FIG. 4 shows a diagrammatic view of a device according to a fourth preferred embodiment of the invention.

With reference to FIG. 4 and according to a fourth preferred embodiment of the invention, a treatment device 1 is made such that each treatment zone 4 is formed from a combination of two electrodes positioned at intervals along the main flow direction of the substance, on the device 10 located in the flow zone 2 of this substance. In this case, the means of creating movement in the treatment zone 4 comprise motor type means 16 to make the device 10 rotate inside the flow zone 2. The two electrodes comprise a primary electrode 108a and a secondary electrode 112a, with opposite polarity, and being placed indifferently on the input side or the output side along the main flow direction of the substance. The treatment zone 4 with a longitudinal pulsed electrical field can then move inside the entire associated passage zone 6.

Figure 5:
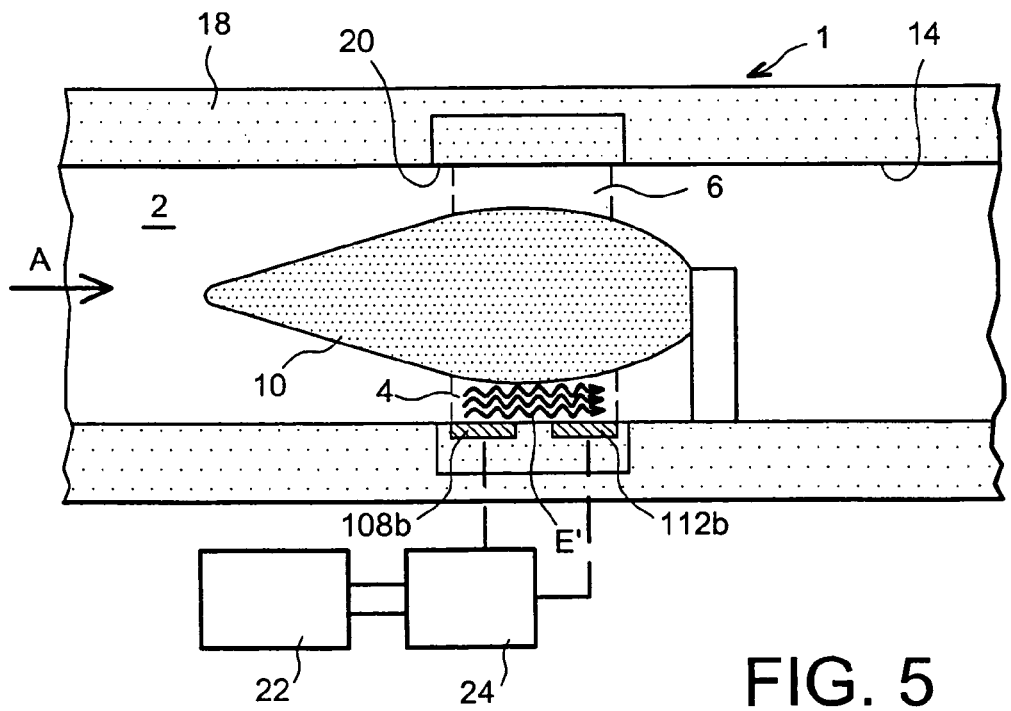
FIG. 5 shows a diagrammatic view of a device according to a fifth preferred embodiment of the invention.

A fifth preferred embodiment of the invention can be used, also to obtain a longitudinal pulsed electrical field. As can be seen in FIG. 5, a device 1 comprises a treatment zone 4 formed by a combination of two electrodes positioned with a space between them, along a main flow direction of the substance. The device 1 comprises a primary electrode 108b and a secondary electrode 112b, each of them being located on a wall 14 partly delimiting the flow zone 2. The means of creating movement in the treatment zone 4 comprise means (not shown) of causing rotation of at least a part 20 of the wall 14 on which these electrodes 108b and 112b are located.

Note that a person skilled in the art will be capable of adapting the rotation speed of the treatment chamber 4 as a function of parameters such as the substance flow or the required treatment quality.

It is also possible to fit several treatment zones 4 in the device 1, in all of the preferred embodiments described above. This technical characteristic can improve the effectiveness of the treatment of the substance, which must pass through several passage zones 6, and it will be subjected to a pulsed electrical field treatment in each zone.

Figure 6:
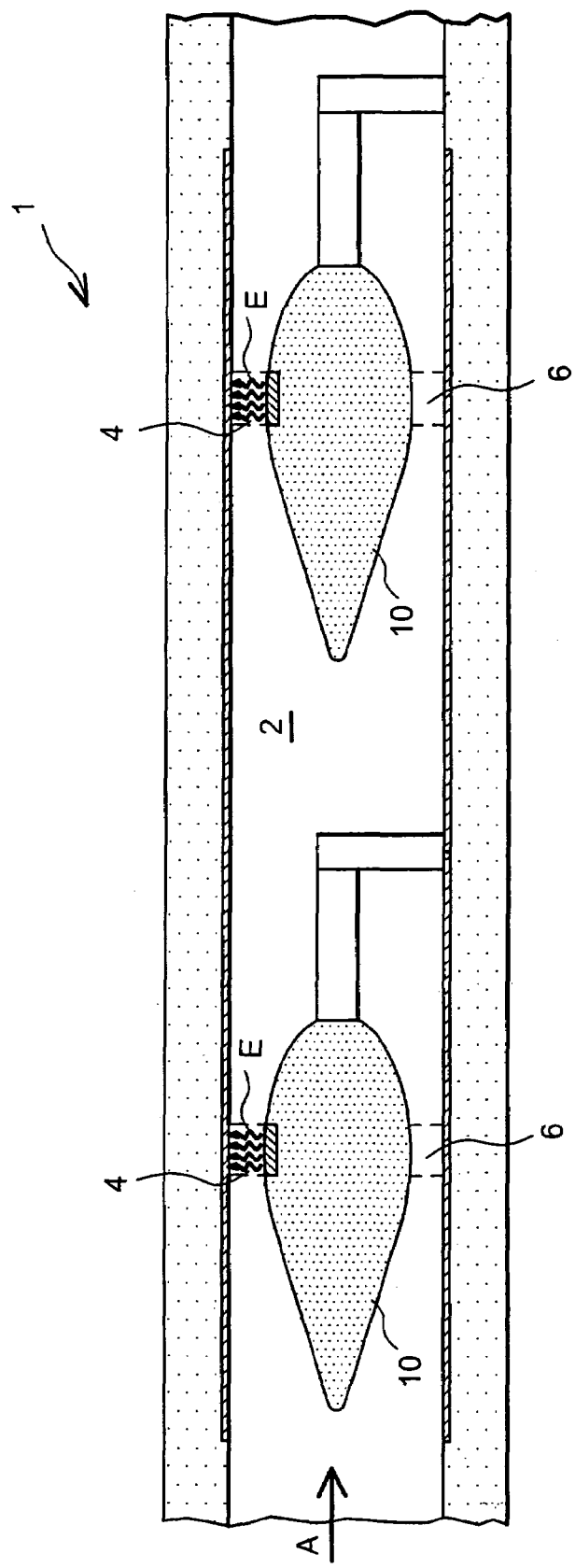
FIG. 6 shows a diagrammatic view of a device according to a sixth preferred embodiment of the invention.

This type of embodiment is illustrated in FIG. 6 showing a sixth preferred embodiment of the invention. The device 1 comprises two treatment zones 4, each being located in its associated passage zone 6, and both being placed in series in the flow zone 2. The fact that the treatment zones 4 are arranged in this way, in other words positioned one after the other along the main flow direction of the substance shown by the arrow A, also gives greater freedom in the choice of the substance/quality ratio. Note that the number of treatment zones 4 is not limited to two, and that these treatment zones 4 can also be obtained using any of the preferred embodiments described above.

In the device 1 according to the invention, the volume of substance treated at treatment time t is less than the volume of the associated passage zone 6. Preferably, the volume of each treatment zone 4 is small and does not exceed a few cubic centimeters. Therefore the impedance of this volume of substance is high, so that the treatment can be performed with lower currents. It is then possible to use generators for which the output currents and costs are lower than those according to prior art.

The use of pulse generators of the type including electronic switches based on semiconductors or matrices of semiconductors is then particularly suitable for device 1. These generators are designed to provide an industrial solution with low investment and operating costs. Furthermore, the recurrence frequency of the pulses with this type of generators can be at 1 MHz, for a pulse frequency of about 50 nanoseconds to about 10 microseconds. Also with these generators, the value of the pulsed electrical field inside each treatment zone 4 can preferably be between 1 kV/cm and about 100 kV/cm, which destroys any undesirable organism that have colonised the substance to be treated.

In order to further reduce the pulse duration so as to treat an even greater volume of substance, it is advantageous to couple the pulse generator 22 to magnetic compression means 24. Since the treatment quality depends only on the amplitude of the electrical pulse, it is desirable to make these pulses as short as possible in order to limit the energy consumed and to cause only a small temperature rise in the substance. There is no need for means of cooling the substance in a case like this, in which the temperature rise of the substance is not very high.

Finally, for a more effective treatment of the substance, the device 1 is designed such that the flow of this substance is continuous within the flow zone 2, and the pulsed electrical field is uniform in each of the treatment zones 4.

The invention also relates to a pulsed electrical field treatment process for a flowing substance colonised by at least one undesirable organism, this process being suitable for use by a device 1 like that described above.

The particular feature of this process in relation with device 1 lies in the fact that only part of the substance located in a passage zone 6 is treated at a given time t. While the substance is flowing inside the flow zone 2, the treatment zone 4 is displaced inside the associated passage zone 6, such that at a time t+δt, the entire passage zone 6 has been scanned by the treatment zone 4 within the associated passage zone 6.

Obviously, a person skilled in the art could make various modifications to the device and the process described above as non-limitative examples only.

The invention claimed is:

1. A treatment device of a substance containing at least one undesirable organism, using a pulsed electrical field, said device comprising:
   one flow zone of the substance in which is located at least one treatment zone located in an associated passage zone of the substance, wherein each treatment zone is only partially located within the associated passage zone; and
   means for creating movement for displacing each substance treatment zone in the entire associated passage zone.

2. A treatment device according to claim 1, wherein each treatment zone is formed by a combination of two electrodes facing each other, said electrodes comprising one primary electrode placed on a device inside the substance flow zone of the substance and a secondary electrode placed on a wall partly delimiting the flow zone.

3. A treatment device according to claim 2, wherein the means for creating movement comprises means for rotating the device inside the flow zone, and wherein the secondary electrode is annular and immobile.

4. A treatment device according to claim 3, wherein the substance flows continuously.

5. A treatment device according to claim 3, wherein the secondary electrode is composed of a conducting duct inside which the substance flows.

6. A treatment device according to claim 2, wherein the means for creating movement comprises means for rotating at least a part of the wall on which the secondary electrode is located, and wherein the primary electrode is annular and immobile.

7. A treatment device according to claim 2, wherein the means for creating movement comprises means for rotating said device inside the flow zone, and wherein the means for creating movement further comprises means for rotating at least a part of the wall on which the secondary electrode is located.

8. A treatment device according to claim 2, wherein the device located in the flow zone comprises an insulating rounded cone.

9. A treatment device according to claim 1, wherein the pulsed electrical field is approximately perpendicular to a main flow direction of the substance.

10. A treatment device according to claim 1, wherein each treatment zone is formed by a combination of two electrodes placed at a spacing from each other, in a main substance flow direction, on a wall partly delimiting the flow zone, the means for creating movement comprising means for rotating at least a part of the wall on which said electrodes are located.

11. A treatment device according to claim 1, wherein each treatment zone is formed by a combination of two electrodes placed at a spacing from each other, in a main substance flow direction, on a device located in a flow zone of the substance, the means for creating movement comprising means for rotating said device inside the flow zone.

12. A treatment device according to claim 2, wherein the applied pulsed electrical field is approximately parallel to a main flow direction of the substance.

13. A treatment device according to claim 1, wherein the device further comprises a pulse generator with electronic switches based on semiconductors.

14. A treatment device according to claim 1, wherein the device further comprises a pulse generator with electronic switches based on matrices of semiconductors.

15. A treatment device according to claim 1 wherein a value of the pulsed electrical field in each treatment zone varies from about 1 kV/cm to about 100 kV/cm.

16. A treatment device according to claim 1, wherein the pulsed electrical field is applied at a recurrence frequency that can reach 1 MHz.

17. A treatment device according to claim 16, wherein the pulse generator is coupled with means for magnetic compression.

18. A treatment device according to claim 1, wherein the pulsed electrical field in each treatment zone comprises pulses with a duration varying from about 50 nanoseconds to about 10 microseconds.

19. A treatment device according to claim 1, wherein the applied pulsed electrical field in each treatment zone is uniform.

20. A treatment device according to claim 1, wherein the device is configured to treat at least one of the substances taken from among liquid foods, semi-solid foods, water, and a mix of at least two these substances.

* * * * *

UNITED STATES PATENT AND TRADEMARK OFFICE
CERTIFICATE OF CORRECTION

PATENT NO.       : 7,255,839 B2
APPLICATION NO.  : 10/490738
DATED            : August 14, 2007
INVENTOR(S)      : Chatroux et al.

Page 1 of 1

It is certified that error appears in the above-identified patent and that said Letters Patent is hereby corrected as shown below:

On the title page, Item (73), the Assignee information is incorrect. Item (73) should read:

-- (73) Assignee:   Commissariat A L'Energie Atomique,
                    Paris (FR) --

Signed and Sealed this

Twenty-third Day of October, 2007

JON W. DUDAS
*Director of the United States Patent and Trademark Office*